(12) United States Patent
Jaffrey et al.

(10) Patent No.: US 8,305,227 B2
(45) Date of Patent: Nov. 6, 2012

(54) WIRELESS AUXILIARY MONITORING AND CONTROL SYSTEM FOR AN UNDERWATER INSTALLATION

(75) Inventors: Andrew Jaffrey, Aberdeenshire (GB); Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 404 days.

(21) Appl. No.: 12/727,903

(22) Filed: Mar. 19, 2010

(65) Prior Publication Data

US 2010/0171637 A1    Jul. 8, 2010

Related U.S. Application Data

(63) Continuation-in-part of application No. 11/454,630, filed on Jun. 15, 2006, now Pat. No. 7,711,322.

(60) Provisional application No. 60/690,964, filed on Jun. 15, 2005, provisional application No. 60/690,966, filed on Jun. 15, 2005, provisional application No. 60/690,959, filed on Jun. 15, 2005.

(51) Int. Cl.
    *H04B 13/02*    (2006.01)
(52) U.S. Cl. ............................ 340/852; 455/40; 340/850
(58) Field of Classification Search .................. 340/852, 340/850; 455/40, 72, 502; 343/179
    See application file for complete search history.

(56) References Cited

U.S. PATENT DOCUMENTS

| | | | |
|---|---|---|---|
| 3,717,844 A | 2/1973 | Barret et al. ................. | 340/5 R |
| 6,058,071 A | 5/2000 | Woodall et al. .................. | 367/3 |
| 6,130,859 A | 10/2000 | Sonnenschein et al. ...... | 367/134 |
| 6,693,553 B1 * | 2/2004 | Ciglenec et al. ........... | 340/853.1 |
| 7,043,204 B2 | 5/2006 | Reagor et al. .................. | 455/40 |
| 7,228,902 B2 | 6/2007 | Oppelt .......................... | 166/250 |
| 7,595,763 B2 * | 9/2009 | Hershey et al. ............... | 343/757 |
| 2006/0044155 A1 * | 3/2006 | Le Briere et al. .......... | 340/854.3 |
| 2009/0204265 A1 * | 8/2009 | Hackett ........................ | 700/284 |

FOREIGN PATENT DOCUMENTS

| | | |
|---|---|---|
| EP | 0922836 | 6/1999 |
| GB | 2163029 | 2/1986 |
| GB | 2377131 | 12/2002 |
| WO | WO 8704028 | 7/1987 |
| WO | 2006/134331 | 12/2006 |

* cited by examiner

*Primary Examiner* — Peguy Jean Pierre
(74) *Attorney, Agent, or Firm* — Paul Davis; Goodwin Procter LLP (57) ABSTRACT

The present invention provides a wireless auxiliary system for monitoring and control of an underwater installation. The auxiliary system of the present invention sends data and control signals between an underwater installation—for example, a lower stack 26 in a hydrocarbon drilling or production facility—and an associated riser assembly 23. Data is collected by sensor network 208A, 208B and is transmitted from a first transceiver 201 to a second transceiver 203 by electromagnetic signals. First transceiver 201 is powered by a local power supply 205. To conserve power consumption, the first transceiver is designed to become active for a short time and then to switch to an inactive mode. For example, wireless data transfer may occur after the detachment or just prior to the reattachment of riser assembly 23 to the underwater installation. Wireless data transfer may also occur on receipt of a handshaking signal from second transceiver 203. Thus, the system of the present invention is capable of providing soft shut-down mode for the underwater installation on detachment of riser assembly 23 and can also safeguard potential risks of reattaching riser 23 when the underwater installation in an unknown state.

22 Claims, 5 Drawing Sheets

WIRELESS AUXILIARY MONITORING AND CONTROL SYSTEM FOR AN UNDERWATER INSTALLATION

CROSS-REFERENCE TO RELATED APPLICATION

This application is a continuation in part of U.S. Ser. No. 11/454,630 now U.S. Pat. No. 7,711,322, which claims the benefit of U.S. Ser. Nos. 60/690,964, 60/690,966, and 60/690,959, all filed Jun. 15, 2005. All of the above applications are fully incorporated herein by reference.

FIELD OF USE

The present invention relates to the field of underwater exploration, hydrocarbon extraction facilities and plants, general underwater installations and other underwater and deep-sea applications.

DESCRIPTION OF THE RELATED ART

A typical hydrocarbon extraction facility comprises the following: a top side rig, which is located on the surface of the sea; a wellhead, where hydrocarbons are extracted from a well buried in the seabed; a production riser which connects from the wellhead on the seabed to the topside rig and which acts as a conduit for fluids between the rig and the wellhead; an umbilical which runs along the riser and which provides power and control of the well head from a control station in the top side rig. Similarly, a hydrocarbon drilling facility comprises a top side rig or drilling vessel; a wellhead installation, providing drilling access to a well buried in the seabed; a drilling riser which connects from the wellhead on the seabed to the topside rig and which acts as a conduit for fluids between the rig and the wellhead; an umbilical which runs along the riser and which provides power and control of the well head from a control station in the top side rig. Different risers are employed for drilling and production facilities, these are often referred to by the generic terms, marine riser or riser.

In shallow water applications, the top side well may be anchored to the seabed. In deep sea applications, the top side rig is typically positioned dynamically, i.e. without being anchored to the seabed and with the ability to move for alignment between the top side rig and the wellhead located on the seabed.

The riser connects to the wellhead via two segments: these are referred to as the Lower Marine Riser Package (LMRP) and the lower stack. Collectively, these two segments are known as a Blow-Out Preventer (BOP). The lower stack is fixed to the wellhead on the seabed and comprises valves, pressure sensors, actuators and other devices for maintaining and monitoring the state of the wellhead. The lower marine riser package is fixed to the lower end of the marine riser and comprises control and monitoring systems for controlling and monitoring the lower stack.

In normal operations, the marine riser remains connected to the wellhead via the blow-out preventer. An umbilical associated with the riser comprises electrical cables, and hydraulic lines which provide control of and monitor the state of the wellhead. Thus, control and monitoring of the wellhead is achieved via a direct wired link through the marine riser. Nonetheless, there are certain operating conditions which require the marine riser to be disengaged from the wellhead. Conditions requiring disconnection of the riser from the wellhead include bad weather, maintenance of the wellhead or other sections of the installation, and unstable operating conditions of the well. When the marine riser is disconnected from the wellhead, the openings are closed off to seal the wellhead. In some cases the marine riser must be disconnected from the well head as an emergency and at short notice. Such an emergency may occur, for example, during a weather event which causes the drilling vessel to "drive off".

In current underwater hydrocarbon installations, the form of the interface between the marine riser and the wellhead is a stab comprising male and female parts. Connection of the riser stab is simultaneous with connection of the umbilical. Thus, connection of the riser stab initiates control of the lower stack via the lower marine riser package; similarly, removal of the riser stab from the wellhead terminates control of the lower stack. When the marine riser is disconnected, there is no ability to control the lower stack; similarly, with the marine riser disconnected, the supply of data from the sensors and valves in the stack is lost so that there is no ability to monitor the lower stack.

Wireless monitoring and control of the lower stack would be preferable; however, prior art systems to not provide suitable means for wireless control and monitoring of a wellhead when the marine riser is disconnected. Problems to be overcome with prior art wireless systems arise from the trade-off between the power required to drive the system for an extended time of operation and the quality of the underwater communications achievable.

Herein incorporated U.S. patent application Ser. No. 11/454,630 "Underwater Communications System and Method", Rhodes et al describes a method for underwater communications by exciting the magnetic component of an electromagnetic signal. The high rate of attenuation of electromagnetic signals underwater creates barriers against the use of electromagnetic signaling for wireless underwater control and monitoring for extended periods and over a long range. Electromagnetic signaling has a limited range underwater and must operate at high power level in order to provide communications. Means to overcome the short range of electromagnetic signals are taught by Rhodes through the use of repeater stations. Similar means are taught by Oppelt in United States patent application publication, 2004/0124994, "High Data Rate Borehole Telemetery System". However, systems based on the use of repeater stations require either wired electrical power for the repeater stations or provide operation for a limited duration using local batteries of the multiple repeaters.

Other systems such as optical systems and acoustic systems do not provide the required reliability: optical systems are affected by turbidity, and acoustic systems are affected by noise, reflections and other distortions when employed near fixed substantially metal installations. U.S. Pat. No. 6,130,859, "Method and Apparatus for Carrying out High Data Rate and Voice Underwater Communication", Sonnenschein et al. describes a system for underwater communications based on the transmission and reception of acoustic waves.

In a state of operation where the riser has just been disconnected, the ability to communicate wirelessly with the lower stack immediately after disconnection e.g. following an emergency disconnect, would offer the ability to provide continuous information regarding the state of the lower stack after disconnection. This is preferable to a system where the flow of information is terminated just prior to disconnection as is currently the case with installations which depend on hardwired (stabbed) connections.

Similarly, in a state of operation where the riser is disconnected but about to be re-connected, the ability to interrogate the lower stack to ascertain the condition of pressures, temperatures, valve states or any other information would provide valuable information regarding potential issues and would provide confirmation that the system is in a stable condition enabling safer operation.

Moreover, in a state of operation where the riser is disconnected, the ability to compare the last known state of the lower stack and the state immediately prior to reconnection would provide information regarding any state change that might have been implemented in the period during which the riser was disconnected, e.g. through local intervention by a remotely operated underwater vehicle.

SUMMARY OF THE INVENTION

Accordingly, an object of the present invention is to provide an auxiliary system for local wireless monitoring of an underwater installation. The auxiliary system of the present invention provides information regarding the state of an underwater installation—for example, a lower blow-out protector stack—after disconnection of a hard wired data link via an umbilical and/or an associated riser. Similarly, the auxiliary system of the present invention provides information regarding the state of an underwater installation prior to reconnection of a hard wired data link via an umbilical and/or an associated riser.

A second object of the present invention is to provide an auxiliary system for local wireless control of an underwater installation. The auxiliary system of the present invention provides control signals to alter the state of an underwater installation—for example, a lower blow-out protector stack—after disconnection of a hard wired data link via an umbilical and/or an associated riser. Similarly, the auxiliary system of the present invention provides control signals to alter the state of an underwater installation prior to reconnection of a hard wired data link via an umbilical and/or an associated riser.

A further object of the present invention is to provide an auxiliary system for local wireless control of an underwater installation which provides a soft shut-down mode for the underwater installation when disconnection of a hard wired control link via an umbilical and/or an associated riser is required.

A further object of the present invention is to provide an auxiliary system for local wireless control of an underwater installation which provides a safeguard against the effects of reconnection of a riser with an underwater installation when the state of the underwater installation is unknown.

A further object of the present invention is to provide an auxiliary system for local wireless control and monitoring of an underwater installation which is capable of operating for an extended time.

A further object of the present invention is to provide an auxiliary system for local wireless control and monitoring of an underwater installation which is capable of operating over an extended range.

STATEMENT OF THE INVENTION

According to a first aspect, the present invention provides a wireless auxiliary system for monitoring an underwater installation. The wireless auxiliary system comprises a first transceiver attached to the remote underwater installation, the transceiver comprising a data processor and being powered by a local power supply.

The wireless auxiliary system further comprises at least one sensor connected to the data processor for sensing data of the underwater installation. A second transceiver is provided and is attached to a riser assembly which is detachable from the underwater installation.

During the detachment of the riser assembly from the underwater installation, the first transceiver becomes active, transmits data from the at least one sensor by electromagnetic signals through the water to the second transceiver and subsequently becomes inactive to conserve power.

In some embodiments, the transmission of data occurs at one or more of the following times: immediately after the detachment of the riser assembly from the underwater installation; immediately prior to the reattachment of the riser assembly to the underwater installation; on receipt of a handshaking signal from the second transceiver. After the detachment of the riser assembly from the underwater installation, the first transceiver switches from an inactive mode to a receive mode, listens for a handshaking signal of the second transceiver, and returns to an inactive mode in the absence of any handshaking signal.

In alternative embodiments, the first transceiver commences transmission of data on reception of an external trigger signal.

In some embodiments, the riser assembly is operable to charge the local power supply via an umbilical cable of the riser assembly during the period when the riser assembly is attached to the underwater installation.

In some embodiments, the local power supply of the first transceiver is a rechargeable battery.

In some embodiments, the first transceiver further comprises a memory device for storing data from the at least one sensor. Preferably, sensor data is collected during the period when the riser assembly is detached from the underwater installation The at least one sensor may be any one of a pressure sensor, a temperature sensor, a hydrophone, a flow rate sensor, a geophone.

In some embodiments, a plurality of sensors are provided.

Optionally, the first and second transceivers employ magnetically coupled antennas.

In typical embodiments, data is transferred by electromagnetic signals having carrier frequencies in the range from 10 Hz to 10 MHz.

In some embodiments, the transmission of data by the first transceiver occurs for a pre-defined time which is less than or equal to 15 minutes. In other embodiments, the pre-defined time is less than or equal to 1% of the subsequent inactive period of the first transceiver.

According to a second aspect the present invention provides a wireless auxiliary system for controlling an underwater installation. The wireless auxiliary system comprises a receiver attached to the remote underwater installation, the receiver comprising a data processor and being powered by a local power supply.

The wireless auxiliary system further comprises at least one actuator connected to the data processor for controlling the state of the underwater installation. A transmitter is also provided; the transmitter is attached to a riser assembly which is detachable from the underwater installation.

During the detachment of the riser assembly from the underwater installation, the transmitter becomes active, transmits control commands for the at least one actuator by electromagnetic signals through the water to the receiver and subsequently becomes inactive to conserve power.

The at least one actuator may be an electrically powered valve for controlling a fluid supply, or a hydraulically powered valve which has an electronic trigger. In some embodiments, a plurality of actuators are provided.

In some embodiments, the transmission of data occurs at one or more of the following times: immediately after the detachment of the riser assembly from the underwater installation; immediately prior to the reattachment of the riser assembly to the underwater installation; on receipt of a handshaking signal from the second transceiver.

In alternative embodiments, the first transceiver commences transmission of data on reception of an external trigger signal.

BRIEF DESCRIPTION OF DRAWINGS

Embodiments of the present invention will now be described with reference to the accompanying figures in which.

DETAILED DESCRIPTION

Figure 1:
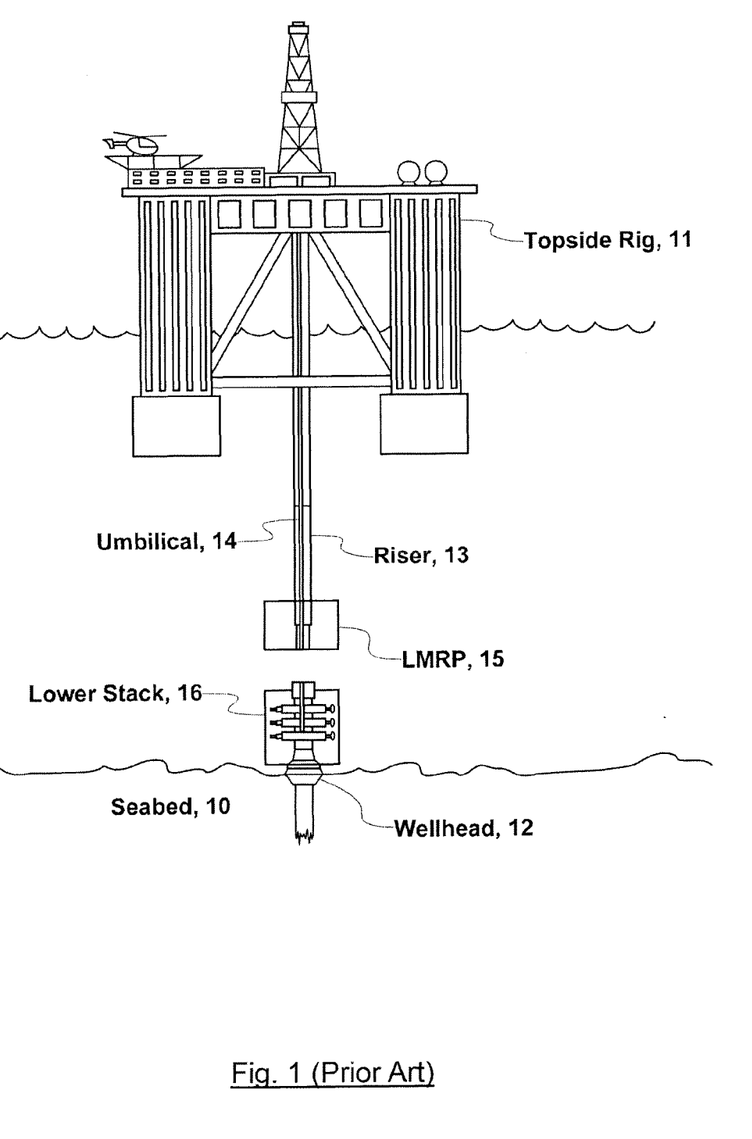
FIG. 1 shows a diagram of a prior art hydrocarbon drilling or production facility.

FIG. 1 shows a diagram of a prior art hydrocarbon drilling facility having an underwater installation comprising a lower stack 16, and a well head 12 on the seabed 10, a topside rig 11 and a riser 13 which connects the topside rig 11 to the wellhead 12 via the lower marine riser package 15 and the lower stack 16. During normal operation, the riser 13 is attached to the wellhead 12 via the lower marine riser package 15 and the lower stack 16. The lower stack 16 is fixed to the wellhead 12 on the seabed and comprises valves, pressure sensors and other devices (not shown) for maintaining and monitoring the state of the wellhead. The lower marine riser package 15 is fixed to the lower end of the riser and comprises control and monitoring systems (not shown) for controlling and monitoring the lower stack 16.

An umbilical 14 associated with the riser 13 comprises electrical cables, and hydraulic lines which provide control of and monitor the state of the wellhead 12. Thus, control and monitoring of the wellhead 12 is achieved via the direct wired link provided by the umbilical 14 and the riser 13. The umbilical 14 is generally attached to the outer side of riser 13.

In certain operating conditions it becomes necessary to detach the riser 13 from the wellhead 12. Conditions requiring detachment of the riser 13 from the wellhead 12 include bad weather, maintenance, and unstable operating conditions of the well. In some cases the riser 13 must be detached from the wellhead 12 as an emergency and at short notice. Such an emergency may occur when a weather event causes the topside rig or drilling vessel to move to a safe area. When the riser is detached from the wellhead, the wellhead opening is closed off to secure the wellhead. Once the riser 13 is disconnected, control and monitoring of the wellhead 12 is no longer possible.

Figure 2:
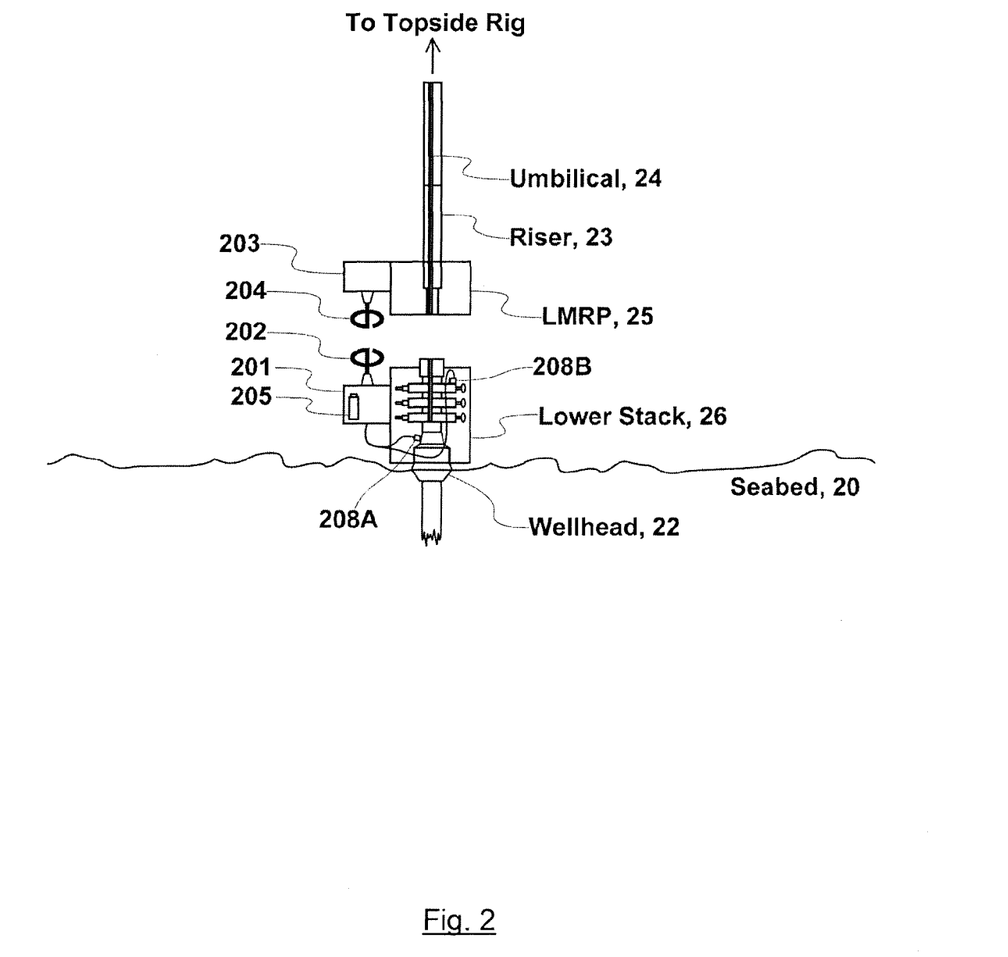
FIG. 2 diagram of a wireless auxiliary monitoring system for an underwater installation according to a first embodiment of the present invention.

FIG. 2 shows a diagram of a wireless auxiliary monitoring system for an underwater installation according to a first embodiment of the present invention. The underwater installation might form one section of a hydrocarbon drilling facility or a hydrocarbon production facility and comprises a lower stack 26, a lower marine riser package 25 and a well head 22 located on the seabed 20. A riser 23 connects to a topside rig or drilling vessel (not shown). During normal operation, the riser 23 is attached to the wellhead 22 via the lower marine riser package 25 and the lower stack 26. The lower stack 26 is fixed to the wellhead 22 on the seabed and comprises valves, pressure sensors and other devices (not shown) for maintaining and monitoring the state of the wellhead. An umbilical 24 associated with the riser 23 includes data and hydraulic lines for the monitoring and control of the wellhead; the control systems may be operated remotely from the topside rig (not shown). The lower marine riser package 25 is fixed to the lower end of the riser 23 and comprises the interface for the control and monitoring systems between the riser 23 and the lower stack 26.

In accordance with the present invention, auxiliary monitoring system of FIG. 2 further comprises a first transceiver 201 and a second transceiver 203. First transceiver 201 is attached to the lower stack 26. Second transceiver 203 is attached to the lower marine riser package 25, at the end of the riser 23. First transceiver 201 comprises an antenna 202. Similarly, second transceiver 203 comprises an antenna 204. For underwater applications, suitable types of antenna include loop antennas, solenoid antennas, Superconducting Quantum Interface Device (SQUID) antennas, dipole antennas, electric field antennas. However, any type of antenna suitable for transmission and reception of low-frequency electromagnetic signals in a medium having a high electrical conductivity would be suitable for use in the present invention.

First transceiver 201 includes a local power supply 205. Power supply 205 provides electrical power for transceiver 201 of the wireless auxiliary system of the present invention. Moreover, local power supply 205 is rechargeable, and is maintained in a constant state of being charged when the riser 23 is attached. Charging is maintained via an electricity supply of umbilical 24 which feeds electrical current to transceiver 201 from the topside rig. Attached to transceiver 201 is a sensor network 208A, 208B. Sensor network 208A, 208B provides data regarding the state of the well head, or may alternatively provide data regarding the state of the lower stack.

Under particular operating conditions, riser 23 is detached from wellhead 22. Detachment of riser 23 from wellhead 22 cuts off the directly wired flow of data from the sensors and/or any other monitoring systems of the lower stack 26 to the control circuitry of the lower marine riser package 25. At the same time detachment of riser 23 from wellhead 22 cuts off the flow of electrical current to charge the local power supply 205 of transceiver 201.

During detachment of the riser 23 from wellhead 22 the auxiliary system of the present invention becomes active. Data collected by sensor network 208A, 208B is processed and transmitted by transceiver 201 and is received by transceiver 203. Thus information regarding the state of wellhead 22 and lower stack 26 can be transferred to the lower marine riser package 25 to enable improved monitoring and safety of the facility.

To increase the operating time of local power supply 205 between recharging, data collected by sensor network 208A, 208B is typically only transmitted during pre-programmed periods or when a request for data is sent by the transmitter of transceiver 203. Thus transceiver 201 remains inactive for most of the time, so that the power consumption of transceiver 201 is minimized.

To further conserve the battery life, data from sensor network 208A, 208B is collected and stored, and transceiver 201 is switched to a transmit mode for a time period just long enough to allow the stored sensor data to be transferred to transceiver 203.

For example, an upper limit of 15 minutes for the transmit mode time period provides a sufficiently long time window to fully transfer stored or to transfer data directly from sensor network 208A, 208B. In any case, power consumption of local power supply 205 is substantially reduced if the time period for transmit mode has a duration which is less than or equal to 1% of the time during which transceiver is inactive.

Due to the very short duration of the periods when first transceiver 201 is in a transmit mode, the power of its associated transmitter can be increased. Consequently, the wireless auxiliary system of an embodiment of the present invention shown in FIG. 2 is capable of operating over an extended range compared with other systems for underwater communications such as herein incorporated U.S. patent application Ser. No. 11/454,630.

Sensor network 208A, 208B may comprise one or more of any type of sensor for monitoring the state or the condition of the underwater installation comprising wellhead 22 and lower stack 26. Examples include—but are not limited to—pressure sensors, temperature sensors, hydrophones, flow rate sensors, a geophones.

In an alternative embodiment to that of FIG. 2, local power supply 205 is charged by a local dynamo located adjacent to or near first transceiver 201 where the dynamo is driven by a hydraulic line of riser 23.

In a further alternative embodiment to that of FIG. 2, local power supply 205 is charged by a local dynamo located adjacent to or near first transceiver 201 where the dynamo is driven mechanical movement of the water surrounding transceiver 201.

Figure 3:
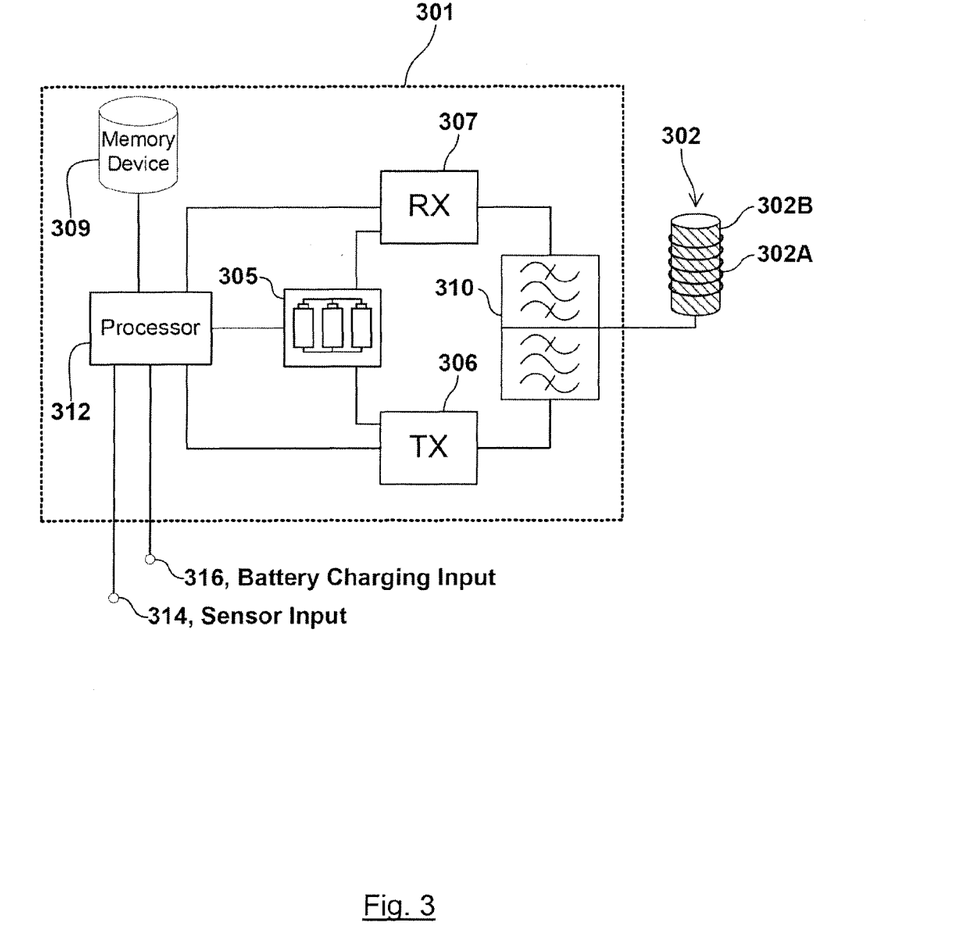
FIG. 3 shows a transceiver for wireless auxiliary monitoring and control of a wellhead according to the present invention.

FIG. 3 shows a block diagram of a transceiver 301 for wireless auxiliary monitoring and control of a wellhead according to the present invention. Transceiver 301 corresponds to transceiver 201 attached to lower stack 26 of FIG. 2. Transceiver 301 comprises transmitter 306 and receiver 307, which are connected to antenna 302 via a duplexer 310. Antenna 302 comprises a coil of wire 302A wound over a former 302B. In some cases, it is preferable to select a former 302B having a material having a high relative magnetic permeability. For example, materials having a magnetic permeability of 10 or more would substantially increase the magnetic moment of antenna 302. In some cases, it is preferable to use an open core former 302B. The choice of the material of the former is based substantially on the power levels to be deployed and the range of transmission.

Transceiver 301 is powered by a local power supply 305. A processor, 312 controls the switching of transmitter 306 and receiver 307. Processor 312 is also powered by local power supply 305. Processor 312 comprises programmable integrated circuits and other electronic devices (not shown) as required and as would be known to a person skilled in the art of electronic circuit design and system design. A battery charging input 316 of transceiver 301 provides an electrical supply to charge local power supply 305. Typically, transceiver 301 is deployed on the lower stack of an underwater installation, as represented by numeral 26 of FIG. 2. Electricity is supplied to battery charging input 316 via umbilical 24 of FIG. 2.

Transceiver 301 further comprises sensor input 314 and memory device 309. Data from a remote sensor or sensor network—for example, numeral 208A of FIG. 2—is fed to sensor input 314 and is stored in memory device 309. Memory device 309 may be a solid state memory device, or any other memory device suitable for the storage of data as would be known to a person skilled in the art of electronic circuit design.

A primary feature of the auxiliary system for local wireless monitoring of an underwater installation embodied in FIG. 2, and FIG. 3 is that first transceiver 201 is capable of transmitting data relating to the state of wellhead 22 and lower stack 26 to second transceiver 203 when the riser is detached from lower stack 26. Transmission of data may be required after the riser 23 has been detached from lower stack 26 for a long period time. The process of underwater communications by electromagnetic signaling requires a large current during data transfer; thus, an efficient power management system is a necessary feature of the present invention.

The present invention provides a system which fulfills the key requirements of an auxiliary system for monitoring an underwater installation. The first key requirement is the transmission of data from sensors of the underwater installation to a riser during the period immediately after detachment of the riser from the underwater installation. The second key requirement is the transmission of data from sensors of the underwater installation to a riser during the period immediately prior to reattachment of the riser from the underwater installation.

Thus, the periods during which data is transmitted are reduced to a minimum by the present invention. In the periods between the transmission of data, transceiver 201 alternates between an inactive mode and a receive-only mode of operation. Consequently, transceiver 201 draws very little current from local power supply 205 for the majority of the time during which riser 23 is detached from lower stack 26. Moreover, transceiver 201 is powered by its local power source only during the periods when riser 23 is detached from lower stack 26.

Figure 4:
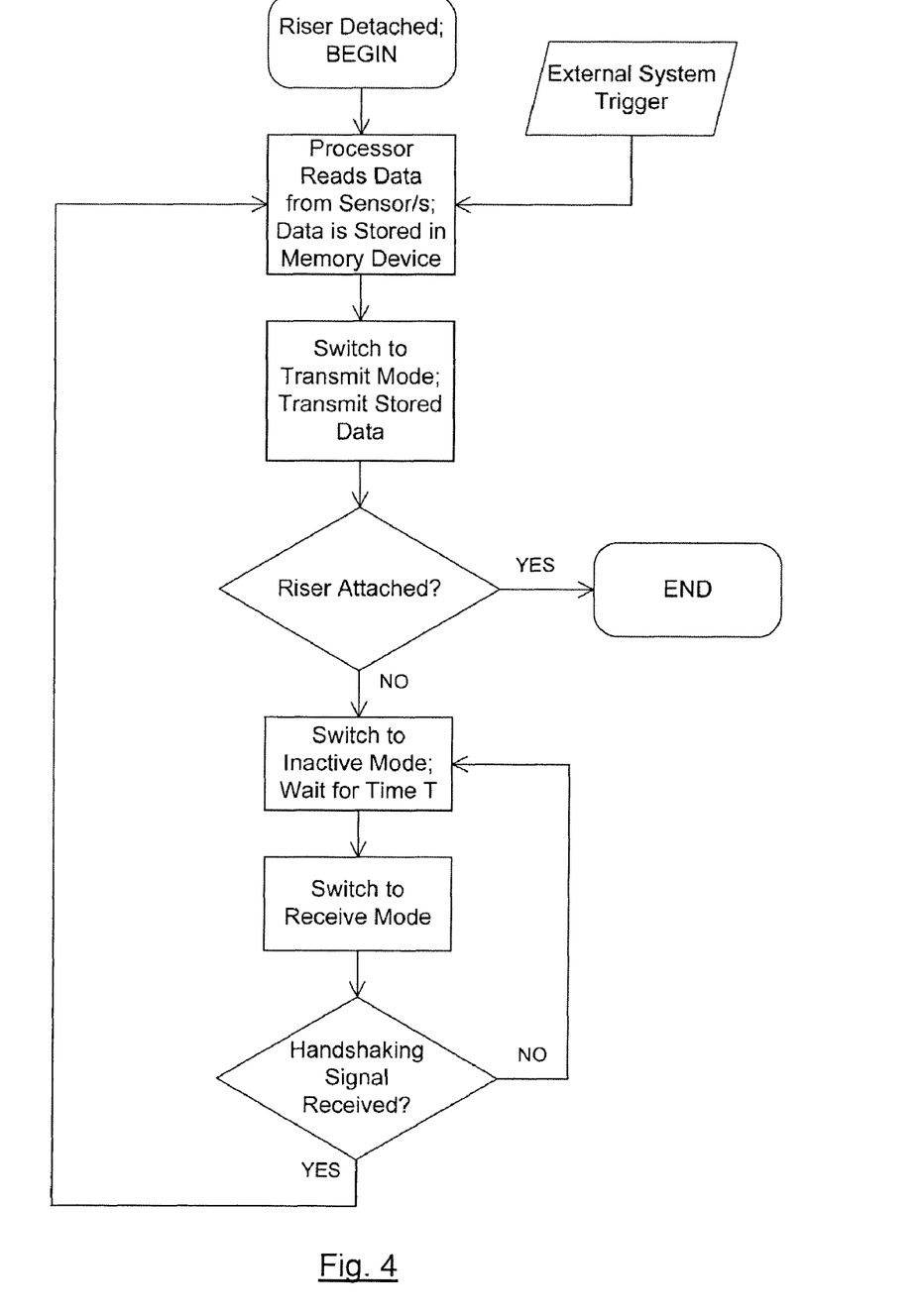
FIG. 4 shows a flowchart of an energy efficient process for wireless monitoring and control of a wellhead according to the present invention.

FIG. 4 shows a flowchart of an energy efficient process for power management of transceiver 201 (FIG. 2) of the wireless auxiliary system for monitoring and control according to the present invention.

The system is activated when riser 23 (FIG. 2) is detached from lower stack 26 (FIG. 2). Transceiver 201 (FIG. 2) is initially in an inactive mode. Data from sensor array 208A, 208B (FIG. 2) is collected by processor 312 (FIG. 3) and is stored in memory device 309 (FIG. 3). Transceiver 201 (FIG. 2) is switched to a transmit mode. The stored data in memory device 309 (FIG. 3) is transmitted from first transceiver 201 (FIG. 2) to second transceiver 203 (FIG. 2).

If the riser is attached or has been re-attached, the system terminates, otherwise transceiver 201 is switched to an inactive mode. After a period of time T has elapsed, transceiver 201 is switched to a receive mode during which it listens for a handshaking signal from a remote transceiver—E.G. transceiver 203 of FIG. 2. If no handshaking signal is detected, transceiver 201 is returned to an inactive state and is where it remains inactive for a time T once again. If the handshaking signal is received, data is collected from sensor array 208A, 208B once again, and the data is stored in memory device 309. Thereafter, transceiver 201 transmits the data stored; the data is received by transceiver 203 (FIG. 2) attached to the lower marine riser package 25 (FIG. 2). This process continues iteratively until the riser 23 is reattached to the wellhead 22 via the lower marine riser package 25 and the lower stack 26.

The auxiliary system for local wireless monitoring of an underwater installation embodied in FIG. 2, and FIG. 3 provides data regarding the state of wellhead 22 and/or lower stack 26 which may form part of a hydrocarbon drilling or production facility. Information is transferred specifically prior to reattachment of the hard wired link via umbilical 24 and the associated riser 23. Similarly, the auxiliary system for local wireless monitoring of an underwater installation embodied in FIG. 2, and FIG. 3 provides information regarding the state of wellhead 22 and/or lower stack 26 immediately after detachment of the hard wired link via umbilical 24 and the associated riser 23.

The system may alternatively be activated by an external trigger input. For example, this could be a test trigger signal sent from a control station, or this could be activation signal from a separate system of the underwater installation.

Thus, the auxiliary system for local wireless monitoring of an underwater installation embodied in FIG. 2, and FIG. 3 provides critical information regarding the state of an underwater installation just after an emergency detachment, during which critical changes in the state may be occurring.

Similarly, the auxiliary system for local wireless monitoring of an underwater installation embodied in FIG. 2, and FIG. 3 provides critical information regarding the state of an underwater installation just before reattachment.

The system is configured to draw a low level of power, and thus is capable of operating over an extended period of time. Moreover, since power consumption is minimized during periods of non-transmission, the system can employ very high levels of transmit power during the periods when data is being transferred. Thus, the system of the present invention is capable of operating over an extended range without any need for repeater stations.

Moreover, the system of FIG. 2 and FIG. 3 provides a long term safeguard against the effects of reattachment of a hard wired data link with an underwater installation when the state of the underwater installation may have changed. In particular, the system of FIG. 2 and FIG. 3 provides a safeguard against the potentially dangerous effects of reconnecting a hard wired data link with an underwater installation in an unknown state.

Figure 5:
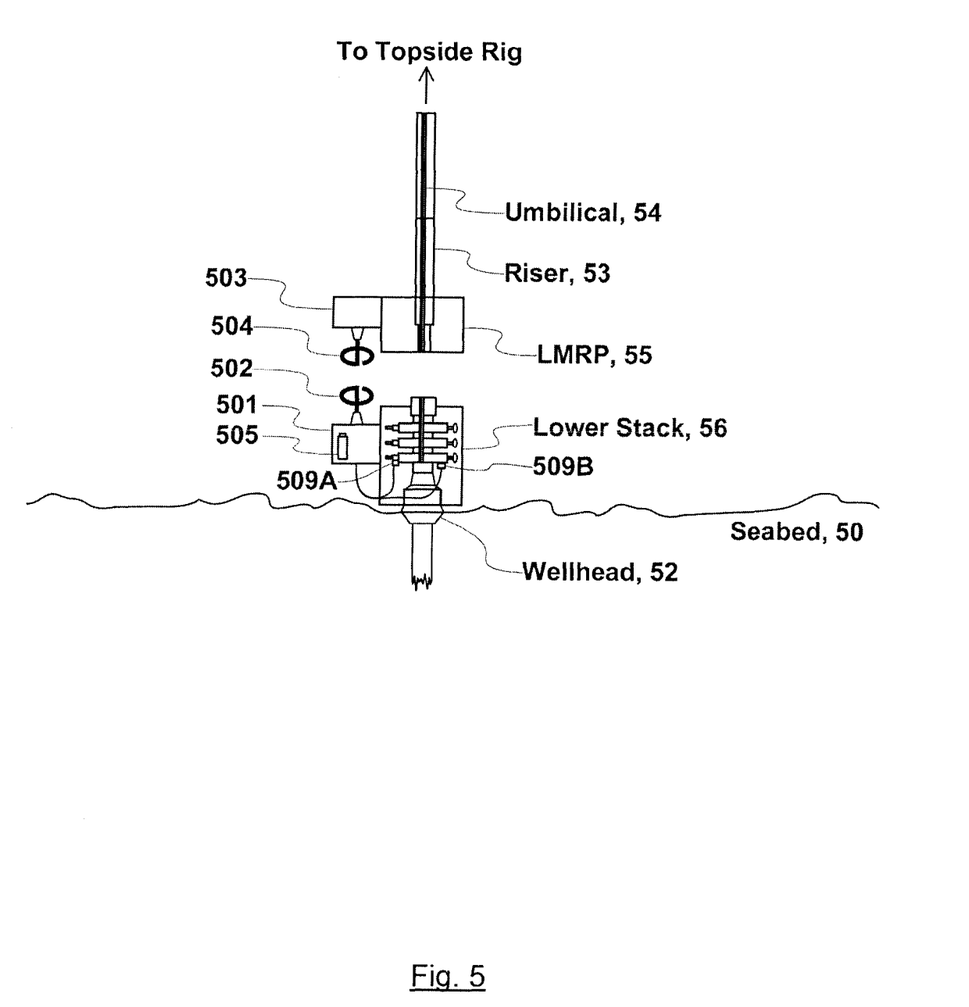
FIG. 5 shows a diagram of a wireless auxiliary control system for an underwater installation according to a second embodiment of the present invention.

FIG. 5 shows a diagram of a wireless auxiliary control system for an underwater installation according to a second embodiment of the present invention. The underwater installation might form one section of a hydrocarbon drilling or production facility and comprises a lower stack 56, a lower marine riser package 55 and a well head 52 located on the seabed 50. A riser 53 connects the wellhead 52 to a topside rig (not shown). During normal operation, the riser 53 is attached to the wellhead 52 via the lower marine riser package 55 and the lower stack 56. The lower stack 56 is fixed to the wellhead 52 on the seabed and comprises actuators, pressure sensors and other devices (not shown) for controlling the state of the wellhead. An umbilical 54 associated with the riser 53 includes data and hydraulic lines for the monitoring and control of the wellhead, the control systems may be operated remotely from the topside rig (not shown). Generally, umbilical 54 is affixed to the outside of the riser 53. The lower marine riser package 55 is fixed to the lower end of the riser 53 and comprises the interface for the control and monitoring systems between the riser 53 and the lower stack 56.

In accordance with the present invention, the wireless auxiliary control system of FIG. 5 further comprises a receiver 501 and a transmitter 503. Receiver 501 is attached to the lower stack 56. Transmitter 503 is attached to the lower marine riser package 55 at the lower end of the riser 53. Receiver 501 comprises an antenna 502. Similarly, transmitter 503 comprises an antenna 504. For underwater applications, suitable types of antenna include loop antennas, and any other types of antennas which are capable of transmission and reception of low-frequency electromagnetic signals through a medium having a high electrical conductivity. Different antennas may be employed for transmitter 503 and receiver 501. For example, a coil or solenoid antenna formed over a block of material having a high relative magnetic permeability—such as ferrite—is highly suitable as a receive antenna. On the other hand, open core coils or solenoids are suitable for use as transmitter antennas in cases where the transmitter produces a high level of output power.

Receiver 501 includes a local power supply 505. Power supply 505 provides electrical power for receiver 501 of the wireless auxiliary system of the present invention. Moreover, local power supply 505 is rechargeable, and is maintained in a constant state of being charged when the riser 53 is attached via an electricity supply of umbilical 54 which feeds electrical current to receiver 501 from the topside rig. Attached to receiver 501 is an array of actuators 509A, 509B. Actuator array 509A, 509B can change or manipulate the state of the well head 52, or may alternatively change the state of the lower stack 56. For example, actuator array 509A, 509B may comprise one or more electrically powered control or shut-off valves. Alternatively, actuator array 509A, 509B may comprise one or more hydraulically powered control valves, which are actuated by an electronic trigger signal.

In another embodiment (not shown) local power supply 505 is maintained in a constant state of being charged by a dynamo which is located adjacent to or near receiver 510. The dynamo is driven by a hydraulic line supplied via umbilical 53.

Under particular operating conditions, riser 53 is detached from wellhead 52. Detachment of riser 53 from wellhead 52 cuts off the systems which control of the lower stack 56 via the umbilical and the lower marine riser package 55. At the same time detachment of riser 53 from wellhead 52 cuts off the supply charge the local power supply 505 of receiver 501.

During detachment of the riser 53 from wellhead 52 the auxiliary system of the present invention becomes active. Transmitter 503 sends control signals from the lower marine riser package 55 to receiver 501. These control signals are processed by receiver 501 and one or more of the actuators in actuator array 509A, 509B is activated according to the signals sent.

To maximize the operating time of local power supply 505, receiver 501 remains inactive for most of the time, so that the power consumption of receiver 501 is minimized.

The auxiliary system for local wireless control of an underwater installation embodied in FIG. 5 provides wireless control of wellhead 52 and/or lower stack 56 which may form part of a hydrocarbon drilling facility or part of a hydrocarbon production facility. In particular, control of the wellhead 52 and lower stack 56 is maintained immediately after detachment of the hard wired link via umbilical 54 and the associated riser 53, and control of the wellhead 52 and lower stack 56 is provided just prior to reattachment of the hard wired link.

Thus, auxiliary system for local wireless control of an underwater installation embodied in FIG. 5 provides a soft shut-down mode for the underwater installation comprising wellhead 52 and lower stack 56 when detachment of the hard wired link via umbilical 54 and the associated riser 53 is necessary. For example, riser 53 may be detached suddenly arising from an emergency, while the wellhead 56 remains in an unstable state. The present invention nonetheless provides wireless control of the wellhead 56, so that it can returned to a stable state despite the detachment of the riser.

Moreover, the system of the present invention depicted in FIG. 2, FIG. 3 and FIG. 5 provides a long term safeguard against the effects of reattachment of a riser to an underwater installation when the state of the underwater installation is unknown. For example, the state of wellhead 22/52 and/or lower stack 26/56 can be monitored prior to reattachment of riser 26/56 and to ensure the operating conditions are satisfactory for reattachment. At the same time, the state of wellhead 22/52 can be controlled prior to reattachment of riser 26/56

Embodiments of the wireless auxiliary system for an underwater installation of the present invention are described herein with particular emphasis on seawater environments. However, the present invention equally applicable to any underwater environment. Any optimization of the present invention to suit specific water constitutions remains within the scope of the present invention. Moreover, the descriptions of the specific embodiments herein are made by way of example only and not for the purposes of limitation. It will be obvious to a person skilled in the art that in order to achieve some or most of the advantages of the present invention, practical implementations may not be exactly as exemplified and can include variations within the scope of the present invention.

What is claimed is:

1. A wireless auxiliary monitoring system for an underwater installation comprising:
   a first transceiver attached to said remote underwater installation comprising a data processor and powered by a local power supply;
   at least one sensor for sensing data of said underwater installation and connected to said data processor of said first transceiver;
   a second transceiver attached to a riser assembly, said riser assembly being detachable from said underwater installation;
   wherein, during the detachment of said riser assembly from said underwater installation, said first transceiver becomes active, transmits data from said at least one sensor by electromagnetic signals through the water to said second transceiver and subsequently becomes inactive to conserve power.

2. A wireless auxiliary monitoring system for an underwater installation according to claim 1 wherein said transmission of data occurs at one or more of the following times:
   on detachment of said riser assembly from said underwater installation; immediately prior to the reattachment of said riser assembly from said underwater installation;
   on receipt of a handshaking signal from said second transceiver.

3. A wireless auxiliary monitoring system for an underwater installation according to claim 2 wherein during the detachment of said riser assembly from said underwater installation, said first transceiver switches from an inactive mode to a receive mode, listens for said handshaking signal of said second transceiver, and returns to an inactive mode in the absence of said handshaking signal.

4. A wireless auxiliary monitoring system for an underwater installation according to claim 1 wherein during the detachment of said riser assembly from said underwater installation, said first transceiver commences transmission of data on receipt of an external system trigger signal.

5. A wireless auxiliary monitoring system for an underwater installation according to claim 1 wherein said riser assembly is operable to charge said local power supply via an umbilical cable of said riser assembly when said riser assembly is attached to said underwater installation.

6. A wireless auxiliary monitoring system for an underwater installation according to claim 1 wherein said local power supply is a rechargeable battery.

7. A wireless auxiliary monitoring system for an underwater installation according to claim 1 wherein sensor data is collected during the detachment of said riser assembly from said underwater installation.

8. A wireless auxiliary monitoring system for an underwater installation according to claim 1 further comprising a memory device which is connected to said data processor of said first transceiver, said memory device storing data collected by said at least one sensor.

9. A wireless auxiliary monitoring system for an underwater installation according to claim 8 wherein stored data of said memory device is transferred during transmission of data from said first transceiver to said second transceiver.

10. A wireless auxiliary monitoring system for an underwater installation according to claim 1 wherein said sensor is one of a pressure sensor, a temperature sensor, a hydrophone, a flow rate sensor, a geophone.

11. A wireless auxiliary monitoring system for an underwater installation according to claim 1 further comprising a plurality of sensors.

12. A wireless auxiliary monitoring system for an underwater installation according to claim 1 wherein at least one of said first transceiver and said second transceiver further comprises a magnetically coupled antenna.

13. A wireless auxiliary monitoring system for an underwater installation according to claim 1 said electromagnetic signals having carrier frequencies in the range from 10 Hz to 10 MHz.

14. A wireless auxiliary monitoring system for an underwater installation according to claim 1 wherein transmission of data takes place for a pre-defined time period which is less than or equal to 15 minutes.

15. A wireless auxiliary monitoring system for an underwater installation according to claim 1 wherein transmission of data takes place for a pre-defined time period which is less than or equal to 1% of said subsequent inactive period.

16. A wireless auxiliary monitoring system for an underwater installation according to claim 1 further comprising at least one actuator for altering the state of said underwater installation and connected to said data processor.

17. A wireless auxiliary control system for an underwater installation comprising:
   a receiver attached to said remote underwater installation comprising a data processor and powered by a local power supply;
   at least one actuator for altering the state of said underwater installation and connected to said data processor;
   a transmitter attached to a riser assembly, said riser assembly being detachable from said underwater installation;
   wherein, during the detachment of said riser assembly from said underwater installation, said transmitter becomes active, transmits control commands for said at least one actuator by electromagnetic signals through the water to said receiver and subsequently becomes inactive to conserve power.

18. A wireless auxiliary monitoring system for an underwater installation according to claim 17 wherein said transmission of data occurs at one or more of the following times:
   on detachment of said riser assembly from said underwater installation; immediately prior to the reattachment of said riser assembly from said underwater installation;
   on receipt of a handshaking signal from said transmitter.

19. A wireless auxiliary control system for an underwater installation according to claim 17 wherein said actuator is powered by said local power supply of said receiver.

20. A wireless auxiliary control system for an underwater installation according to claim 17 wherein said actuator is one of an electrically powered valve and a hydraulically powered valve which has an electronic trigger.

21. A wireless auxiliary control system for an underwater installation according to claim 17 further comprising a plurality of actuators.

22. A wireless auxiliary control system for an underwater installation according to claim 17 comprising a first transceiver in place of said receiver, and a second transceiver in place of said transmitter.

* * * * *